Aug. 14, 1923.
B. ROCKMAN
WINDSHIELD CLEANER
Filed Sept. 28, 1921
1,464,776
2 Sheets-Sheet 1
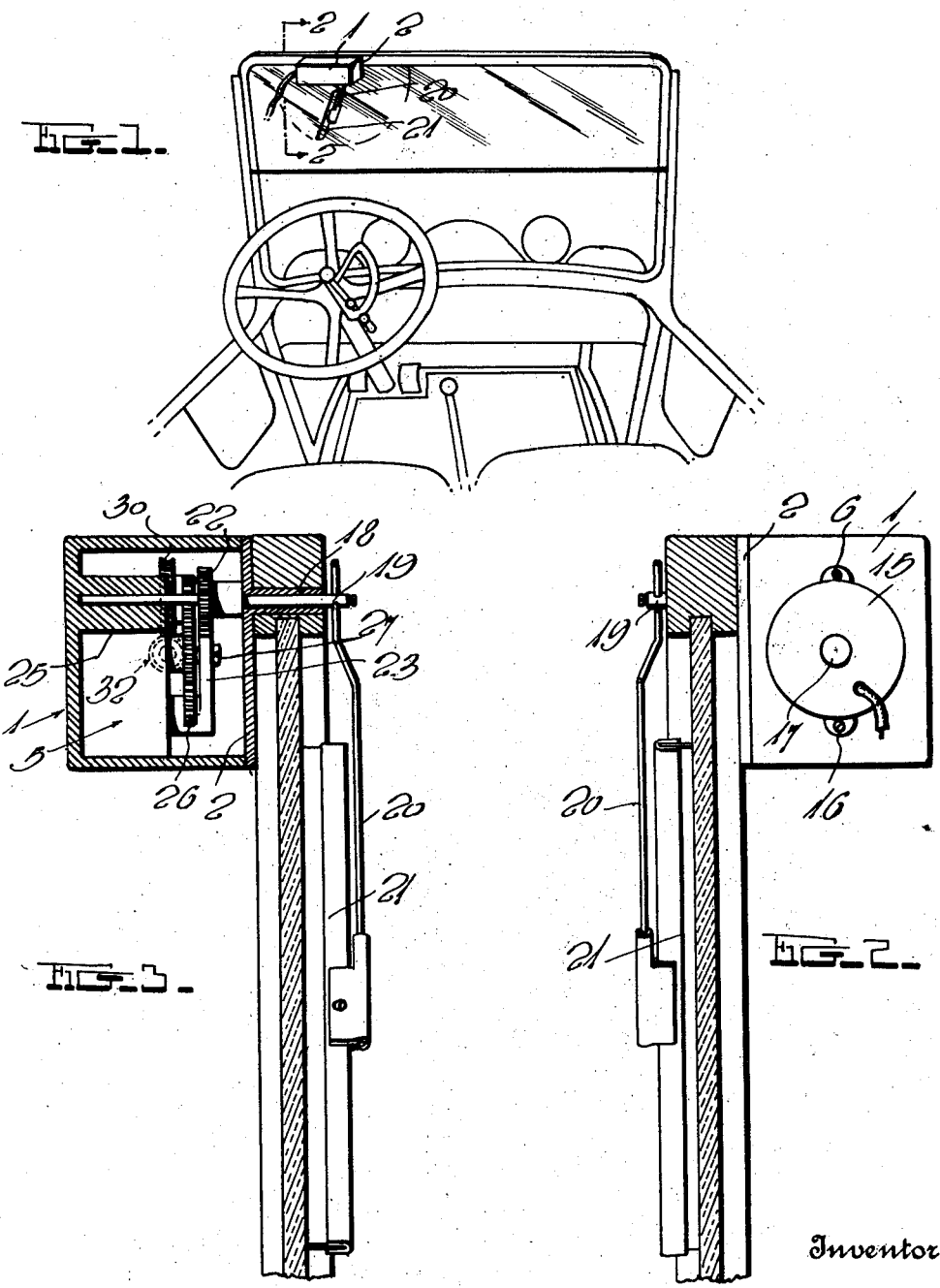
Witness
H. Woodard
Inventor
BENNETT ROCKMAN
By H. B. Wilson & Co.
Attorneys Aug. 14, 1923.
B. ROCKMAN
WINDSHIELD CLEANER
Filed Sept. 28, 1921
1,464,776
2 Sheets-Sheet 2
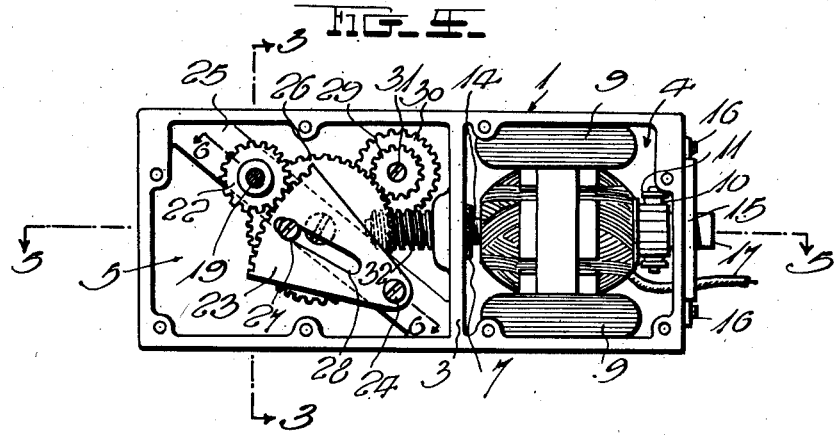
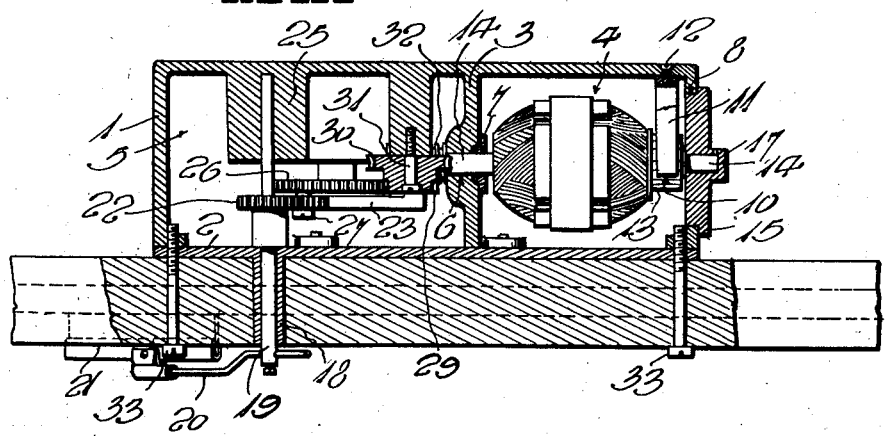
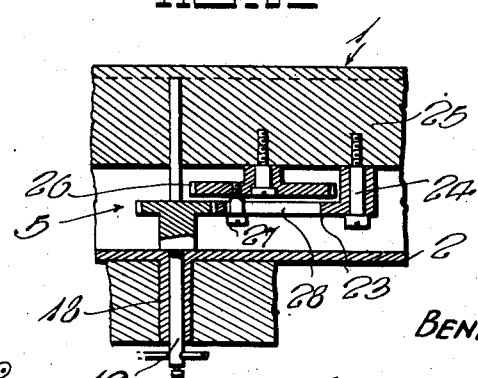
Witness
H. Woodard
Inventor
BENNETT ROCKMAN
By H. B. Wilson &co.
Attorneys Patented Aug. 14, 1923.

1,464,776

UNITED STATES PATENT OFFICE.

BENNETT ROCKMAN, OF BOSTON, MASSACHUSETTS.

WINDSHIELD CLEANER.

Application filed September 28, 1921. Serial No. 503,713.

*To all whom it may concern:*

Be it known that I, BENNETT ROCKMAN, a citizen of the United States, residing at Boston, in the county of Suffolk and State of Massachusetts, have invented certain new and useful Improvements in Windshield Cleaners; and I do declare the following to be a full, clear, and exact description of the invention, such as will enable others skilled in the art to which it appertains to make and use the same.

My invention relates to windshield cleaners and has for its principal object to provide an extremely simple, compact and efficient device which may be easily mounted on the upper part of the usual windshield frame, the wiper or squeegee being located at the outer side of the shield to clean snow, rain and the like therefrom, while the casing carrying all operating parts is disposed at the inner side of the windshield and is thus covered and protected by the usual automobile top.

In carrying out the above end, a further aim is to provide an improved type of casing for the operating parts which is divided by a partition into a motor compartment and a gearing compartment, the walls of said motor compartment serving as a casing for the motor armature, field coils, brushes, etc., whereby great economy in space is effected.

Yet another object is to provide a construction in which the armature of the motor may be readily inserted into the motor compartment or removed therefrom, should the latter operation be necessary, for instance to make repairs.

A still further object of the invention is to provide a unique arrangement of gearing for slowly operating the windshield wiper, even though the motor armature and its shaft travel at a relatively high rate of speed.

With the foregoing in view, the invention resides in the novel subject matter hereinafter described and claimed, the descriptive matter being supplemented by the accompanying drawing.

Figure 1 is a perspective view showing my invention applied to a windshield.

Figure 2 is a vertical section on line 2—2 of Fig. 1, the casing being in elevation.

Figure 3 is a vertical section on line 3—3 of Fig. 4.

Figure 4 is an elevation of the casing and parts housed therein.

Figure 5 is a horizontal section on line 5—5 of Fig. 4.

Figure 6 is a detail sectional view on line 6—6 of Fig. 4.

In the drawings above briefly described, the numeral 1 designates a horizontally elongated casing which, with the exception of a removable side plate 2, is preferably cast in a single piece. The casing 1 is provided with a transverse partition 3 dividing it into a motor compartment 4 and a gearing compartment 5, said partition being provided with a comparatively small bearing opening 6 surrounded by an appropriate packing 7 of felt or the like, while the outer end wall of the motor compartment is formed with a relatively large opening 8 which is in substantially axial alinement with the bearing opening 6. Fixedly mounted within the motor compartment 4, are the field coils 9 of an electric motor, the brushes 10 of said motor being also fixedly mounted in said compartment. These brushes are by preference carried by a U-shaped frame 11 which is detachably secured to one of the casing walls by suitable fastening means 12. By releasing this fastening means, the frame 11 may be turned to such a position as to successfully expose the brushes 10 whenever it is necessary to have access thereto. The motor armature 13 is inserted into the compartment 4 through the opening 8 with the inner end of its shaft 14 extending through the opening 6 and engaging the packing 7, the latter serving to prevent oil from leaking into the motor compartment from the gearing compartment. After insertion of the armature 13, the opening 8 is closed by an appropriate plate 15 secured in place by screws or the like 16, said plate being provided with a central bearing 17 for the outer end of the shaft 14.

By employing the construction disclosed, the walls of the compartment 4 constitute the sole casing for the motor parts and hence economy in space is effected which could not otherwise be attained.

The portion of the removable side plate 2, forming one wall of the gearing compartment 5, is provided with a rigid outwardly extending bearing stud or tube 18 in which a wiper-operating shaft 19 is mounted, the outer end of said shaft, as here shown, being provided with a detachable arm 20 carrying a suitable wind-shield wiper or squeegee 21. The inner end of the shaft 19 carries a pinion 22 which meshes with a gear segment 23 which is mounted for oscillation upon a suitable stub-shaft 24 rising from a diagonal lug or rib 25 which is cast in the compartment 5. Rotatably mounted on the shaft 24 between the segment 23 and the lug 25 is a gear 26 having a wrist-pin 27 received in a longitudinal slot 28 with which said segment is provided. The gear 26 meshes with a drive pinion 29 which is integral with or otherwise suitably connected with a worm-gear 30, the two being mounted on a suitable stub-shaft 31. The worm gear 30 is in mesh with a worm 32 removably mounted on the inner end of the motor shaft 14 in any suitable manner.

When applying the invention to a windshield, three openings are drilled through the upper portion of the windshield frame, two of these openings receiving attaching screws 33 while the bearing tube 18 extends through the other opening, it being of course necessary to temporarily detach the arm 20 from the shaft 19 in order that the latter may be passed through the windshield frame. This having been done, the arm 20 is again applied and is adjusted to the most advantageous length. The field coils and brushes are now connected with the usual electric system of the machine and when the switch is closed, the motor will operate, thereby slowly oscillating the shaft 19 and its arm 20 and moving the wiper 21 to and fro across the portion of the windshield in the driver's line of vision, thereby keeping this portion entirely free of rain, snow or the like.

My invention is extremely simple and inexpensive, is exceptionally compact, may be quickly and easily applied, and will be highly efficient and desirable. Since these results are obtained in an expeditious manner by the details herein disclosed, these details are preferably followed. I wish it understood however that within the scope of the invention as claimed, numerous changes may be made.

I claim:

Enclosing means for wiper-operating mechanism, comprising a rectangular one-piece cast metal casing member open at one side throughout its length and provided with an integral transverse partition dividing it into a motor compartment and a gearing compartment, said partition having a central bearing opening while the outer end wall of said motor compartment is formed with a relatively large opening through which a motor armature may be inserted with its shaft extending through said bearing opening, a plate secured removably to the casing member and closing said relatively large opening, said plate having a bearing for the armature shaft, a bearing boss in the gearing compartment formed integrally with said casing member and instrumental in mounting gearing and a shaft in said gearing compartment to be driven by the armature shaft, and a one-piece cover detachably secured to said casing member and closing the open side thereof, said cover having an integral outwardly extending bearing for the gear-driven shaft.

In testimony whereof I have hereunto set my hand.

BENNETT ROCKMAN.